United States Patent [19]

Chlanda et al.

[11] Patent Number: 4,738,764
[45] Date of Patent: Apr. 19, 1988

[54] ELECTRODIALYSIS MEMBRANES COMPRISING SULFONATED CONSTITUENTS

[75] Inventors: Frederick P. Chlanda, Rockaway; Robert S. Cooke, Morris Plains, both of N.J.

[73] Assignee: Allied Corporation, Morris Township, Morris County, N.J.

[21] Appl. No.: 869,555

[22] Filed: Jun. 2, 1986

[51] Int. Cl.$^4$ ............................................. C25B 13/08
[52] U.S. Cl. ................................... 204/296; 204/11; 521/27; 521/33; 264/204; 264/216; 264/331.15; 264/344
[58] Field of Search ............................ 204/296, 182.4; 264/204, 216, 331.15, 344, 343; 521/27, 33

[56] References Cited

U.S. PATENT DOCUMENTS

| | | | |
|---|---|---|---|
| 4,166,014 | 8/1979 | Sata et al. | 204/296 |
| 4,169,023 | 9/1979 | Sata et al. | 204/296 |
| 4,287,042 | 9/1981 | Ebdon et al. | 204/296 |
| 4,326,914 | 4/1982 | Höhne | 204/296 |
| 4,537,668 | 8/1985 | Gaussens et al. | 204/296 |
| 4,645,579 | 2/1987 | Weiss et al. | 204/182.5 |

*Primary Examiner*—John F. Niebling
*Assistant Examiner*—Kathryn Rubino
*Attorney, Agent, or Firm*—Richard A. Negin; Gerhard H. Fuchs

[57] ABSTRACT

Permselective membranes are disclosed which comprise a layer comprising polystyrene, at least a portion of which is sulfonated, and between about 10 wt. % and about 35 wt. % monovinyl arene-hydrogentated diene block copolymer, at least a portion of which is sulfonated. The membranes exhibit a resistance of less than about 8 $\Omega$-cm$^2$ in 7 wt. % Na$_2$SO$_4$ and an ion exchange capacity of between about 1.0 meq/g and about 1.6 meq/g. Monopolar and bipolar membranes comprising the layer are disclosed. A preferred process for forming the membranes comprises the steps of sulfonating polystryene and monovinyl arene-hydrogenated diene block copolymer, forming a mixture of the materials in a solvent, forming a layer of the mixture and drying the layer to form at least a portion of the membrane.

27 Claims, 3 Drawing Sheets

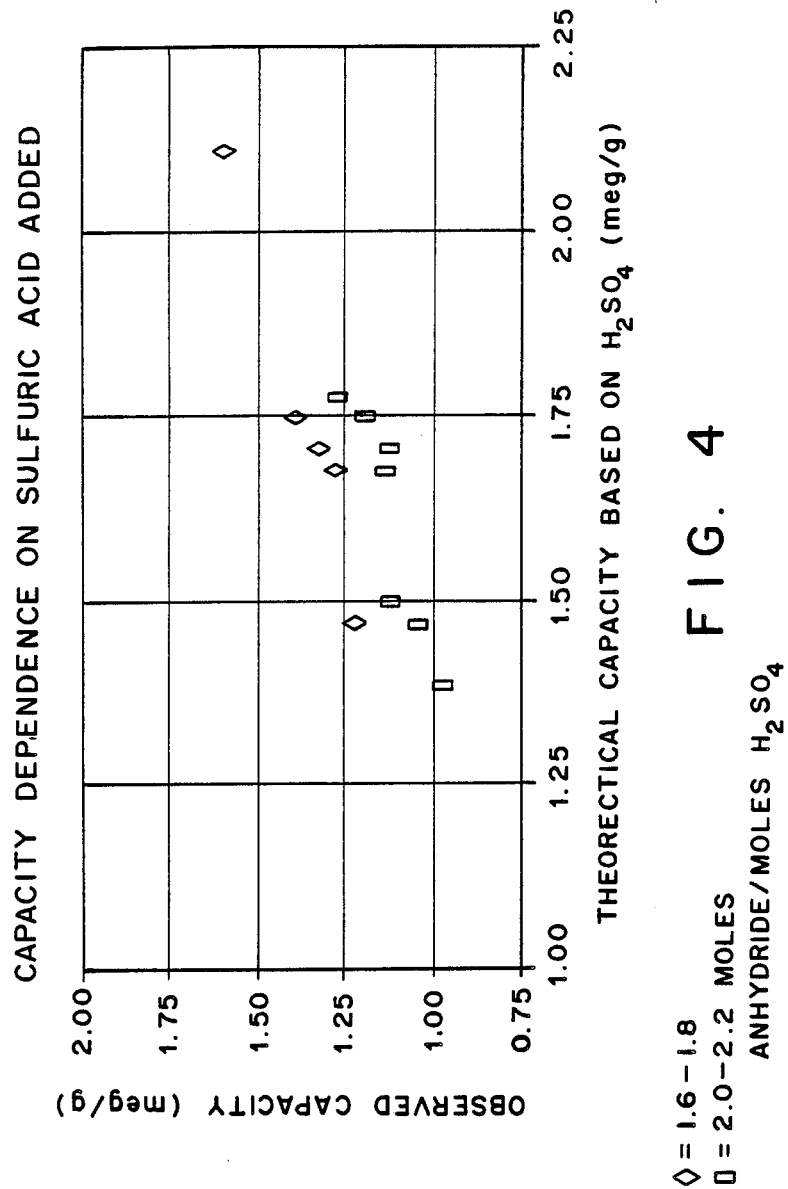

ELECTRODIALYSIS MEMBRANES COMPRISING SULFONATED CONSTITUENTS

FIELD OF THE INVENTION

This invention relates to the production of permselective membranes useful in the field of electrodialysis and, more particularly, in the field of electrodialytic water splitting.

BACKGROUND OF THE INVENTION

Ion selective membranes, i.e., membranes having selectivity to ionic species, are an important class of permselective membranes, and are well known. They include anion exchange membranes, cation exchange membranes, and bipolar membranes. The primary objectives of those in the art of electrodialysis are the production of permselective membranes which exhibit high permselectivity and low resistance over long periods of time and which (in the case of bipolar membranes) have the ability to operate at high current densities. For these properties to be stable over an extended period of time, the membrane must, of course, be mechanically stable.

To date, a number of permselective membranes, including monopolar and bipolar membranes, have been produced which have a wide range of constructions and compositions and which, to at least some extent, meet the primary objectives outlined above. The notable monopolar membranes include Selemion ® CMV cation membranes from Asahi Glass Co., Neosepta CL-25T of Tokuyama Soda Co., Ltd., and Dupont's Nafion ® fluorocarbon membranes, especially Nafion ® 110, 901 and 324 membranes. While these membranes have achieved some degree of commercial success, they are not acceptable for use in a number of applications. In the area of bipolar membranes, U.S. Pat. No. 4,116,889 discloses bipolar membranes which have achieved the basic goals essential for commercial applications. Nevertheless, further improvement in the performance of bipolar membranes is warranted, especially in the use of larger, e.g. 1 m² surface area, bipolar membranes where mechanical stability is of great concern.

SUMMARY OF THE INVENTION

We have discovered a construction suitable for forming monopolar and bipolar membranes which not only yields membranes exhibiting excellent electrical properties, but also significantly enhances the mechanical properties of the membranes. To that end, permselective membranes of the present invention comprise a layer comprising polystyrene, at least a portion of which is sulfonated, and between about 10 wt. % and about 35 wt. % monovinyl arene-hydrogenated diene block copolymer, at least a portion of which is sulfonated, said layer having an ion exchange capacity of between about 1.0 meq/g and about 1.6 meq/g. More specifically, cation exchange membranes of the present invention comprise the above-described layer composition and preferably exhibit an ion exchange capacity of between about 1.0 meq/g and about 1.3 meq/g. Bipolar membranes in accordance with the present invention comprise the above described layer, and most preferably, the layer has an ion exchange capacity between about 1.3 meq/g and about 1.6 meq/g. In the annealed form, membranes produced in accordance with the present invention exhibit a resistance of less than about 8 $\Omega$-cm² and a current efficiency (at 109 ma/cm²) of at least about 70%. Most preferably, the resistance is less than about 4 $\Omega$-cm² and the efficiency is at least about 75%.

A method of forming the membranes comprises the step of forming a mixture comprising sulfonated polystyrene and sulfonated monovinyl arene-hydrogenated diene block copolymer in a solvent, forming the mixture into a layer of a prescribed thickness, and evaporating the solvent from the mixture, the layer having an ion exchange capacity of between about 1.0 meq/g and about 1.6 meq/g. An additional novel feature of the invention is the step of annealing these membranes in a salt solution to enhance the long term stability of the electrical properties of the membranes.

BRIEF DESCRIPTION OF THE DRAWINGS

FIG. 4 graphically depicts the dependence of capacity on the amount of $H_2SO_4$ added to the reactants and the ratio of acetic anhydride to $H_2SO_4$ in the reaction.

DETAILED DESCRIPTION OF THE INVENTION

Figure 1:
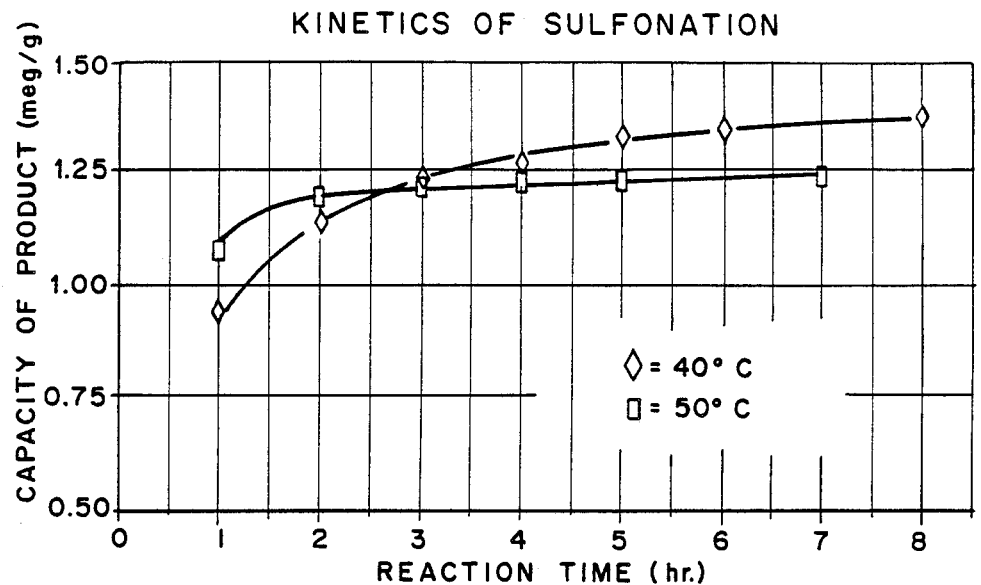
FIG. 1 graphically illustrates the course of the sulfonation reaction at different temperatures for the most preferred layer forming materials.

The present invention is directed to permselective membranes having enhanced mechanical properties coupled with excellent electrical properties. The membranes are particularly useful in electrodialysis and, more particularly, useful in electrodialytic water splitting. The membranes comprise a layer comprising polystyrene, at least a portion of which is sulfonated, and between about 10 wt. % and about 35 wt. % monovinyl arene-hydrogenated diene block copolymer, at least a portion of which is sulfonated. The layer exhibits a resistance of less than about 8 $\Omega$-cm² (in the annealed form) and an ion exchange capacity of between about 1.0 meq/g and about 1.6 meq/g. Bipolar and monopolar membranes comprising the above described layer can be readily produced.

Polystyrene is the principal constituent of the layer. The term "polystyrene" as used herein is intended to include polystyrene and styrene containing copolymers and derivatives thereof. Thus, the general formula which represents the class of polymers useful in the present invention and which is referred to as polystyrenes.

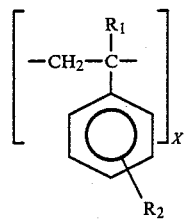

where $R_1$ is hydrogen or an alkyl group, $R_2$ is H, alkyl or a functional group such as Br, Cl, Fl, $CH_2Cl$, phenyl, sulfone, or the like, and X is an integer greater than 50, usually greater than 100 and generally greater than about 500. The molecular weight of the polystyrene employed is not critical. Generally, the molecular weight is between about 50,000 and about 500,000.

The layer also comprises monovinyl arene-hydrogenated diene block copolymer. The block copolymer is present in the layer in an amount between about 10 wt. % and about 35 wt. % (basis solids). The block copolymer can be produced, for example, by the procedure disclosed in U.S. Pat. No. 3,557,357 which is incorporated herein by reference. The block copolymer functions to enhance the mechanical properties of the layer without adversely affecting the electrical properties. In the production of bipolar membranes in accordance with the present invention, the block copolymer is, preferably, present in an amount of between about 15 wt. % and about 25 wt. % and most preferably is present in an amount between about 18 wt. % and about 25 wt. %. In the production of cation exchange membranes in accordance with the present invention, the block copolymer is, preferably, present in an amount between about 15 wt. % and about 35 wt. % and most preferably present in an amount between about 20 wt. % and about 35 wt. %. The average molecular weight of each block of the monovinyl arene blocks usually will vary from about 8,000 to about 30,000 and in each block of the hydrogenated diene blocks from about 5,000 to about 150,000. Preferably, the monovinyl arene blocks are styrene, alpha-methyl styrene, or mixtures thereof, and the hydrogenated diene blocks are hydrogenated butadiene, hydrogenated isoprene or mixtures thereof. Most preferably, the copolymer employed is a polystyrene-hydrogenated butadiene block copolymer.

In the most preferred embodiment of the invention, the layer will consist essentially of the partially sulfonated polystyrene and block copolymer. However, non-volatile additions, such as those employed to impart greater porosity to, or to improve the mechanical stability of, or to limit dimensional changes of the layer, may be included in the layer without departing from the scope of the invention.

The polystyrene and the block copolymer which comprise the layer are at least partially sulfonated. The degree of sulfonation is important in producing the desired ion exchange capacity in the layer. In the present invention, the degree of sulfonation is controlled to yield an ion exchange capacity of between about 1.0 meq/g and about 1.6 meq/g, preferably between about 1.1 meq/g and about 1.6 meq/g. This corresponds to a percent sulfonation (ratio of $SO_3H$ groups to vinyl groups $\times 100$) of between about 10% and about 20% (based on polystyrene) and between about 12% and about 20% for the preferred range of ion exchange capacity. Most preferably, bipolar membranes within the scope of the present invention exhibit an ion exchange capacity of between about 1.3 meq/g and about 1.6 meq/g. However, cation exchange membranes within the scope of the present invention exhibit an ion exchange capacity which is preferably between about 1.0 meq/g and about 1.3 meq/g, more preferably between about 1.1 meq/g and about 1.3 meq/g and most preferably between about 1.15 meq/g and about 1.25 meq/g. In the case of bipolar membranes, we have discovered that an ion exchange capacity of between about 1.3 meq/g and about 1.6 meq/g in a cation permselective layer of the membrane significantly enhances the long-term stability of the bipolar membrane.

In the case of cation membranes, the preferred ion exchange capacity enhances the electrical and the mechanical properties of the membrane.

The relationship between membrane efficiency and resistance is known. Generally, it is that as resistance increases, efficiency increases. However, it should be readily apparent that the higher the resistance, the more power consumed in the process of transporting ions across the membrane. In contrast, membranes within the scope of the present invention exhibit high efficiency at a low resistance. Typically, the membrane resistance is less than about 8 $\Omega\text{-cm}^2$. The efficiency of the membrane at this resistance level is about 90% in 15 wt. % NaOH. Ordinarily, membrane resistance is between about 2 $\Omega\text{-cm}^2$ and about 6 $\Omega\text{-cm}^2$, preferably is between about 2 $\Omega\text{-cm}^2$ and about 4 $\Omega\text{-cm}^2$, and most preferably is between about 2.5 $\Omega\text{-cm}^2$ and about 3.5 $\Omega\text{-cm}^2$. In the range of 2 $\Omega\text{-cm}^2$ to 6 $\Omega\text{-cm}^2$, the membrane exhibits an efficiency of between about 70% and about 85%. In the range of 2 $\Omega\text{-cm}^2$ to 4 $\Omega\text{-cm}^2$, the efficiency is between about 70% and about 80%, and in the range of about 2.5 $\Omega\text{-cm}^2$ to about 3.5 $\Omega\text{-cm}^2$ the efficiency is between about 72% and about 78%. Most preferably, the membranes exhibit a resistance of less than 4 $\Omega\text{-cm}^2$ and an efficiency of at least about 75%. All of the above-described values of resistance and efficiency are values for membranes which are annealed after formation by the procedure described hereinbelow.

Preparation of the membranes in accordance with the invention is affected, most preferably by the steps of forming a mixture comprising at least partially sulfonated polystyrene and at least partially sulfonated monovinyl arene-hydrogenated diene copolymer in a solvent forming a layer comprising the above-described mixture, and thereafter evaporating solvent from the layer, the layer having a resistance of less than about 8 $\Omega\text{-cm}^2$ (in the annealed form) and an ion exchange capacity of between about 1.0 meq/g and about 1.6 meq/g. Membranes may also be formed by the well-known techniques of extrusion or compression molding of a mixture of the above-described polymers. The method disclosed in U.S. Pat. No. 4,014,847 may be especially useful in preparing mixtures of the materials for such molding processes.

The sulfonation is ordinarily carried out by reacting each of the polystyrene and the block copolymer with a material which will convert the polystyrene and block copolymer to the sulfonic acid forms, but which will not cause any material amount of polymer degredation or crosslinking. The sulfonation reaction is generally carried out with reactants such as sulfuric acid, oleum, sulfur trioxide, chlorosulfonic acid, alkyl phosphate complexes of $SO_3$ or acyl sulfates. Other sulfonation reactants are also known in the art and could be employed. Preferably, we employ alkyl phosphate complexes of $SO_3$ of the type disclosed in U.S. Pat. No. 3,205,285 and U.S. Pat. No. 3,072,618, or acyl sulfates of the type disclosed in U.S. Pat. No. 3,836,511.

In the sulfonation of the polystyrene and the block copolymer, the reaction can be carried out separately followed by mixing of the constituents, or can be carried out after pre-mixing of the constituents. The latter approach is most preferred. With either approach, the polystyrene and block copolymer are, most preferably, initially dissolved in a solvent, for example dichloroethane, methylene chloride, dichloro-benzene, tetrachloroethylene or any other solvent which is inert to sulfonation, such as aliphatic hydrocarbons (e.g., hexane, cyclohexane) or mixtures thereof. The amount of solvent employed is an amount convenient to dissolve the constituents. Typically, the solvent is employed in an amount to yield a 5 wt % to about 25 wt % solution. Thereafter, the sulfonating reagent is added under controlled conditions to sulfonate the reactants to the desired degree. With the preferred sulfonation reactants of the present invention, sulfonation is generally carried out at between about 40° C. and about 0° C. for a period of between about 3 to 8 hours, to produce a degree of sulfonation of between about 10% and about 20% (basis polystyrene) which corresponds to an ion exchange capacity of between about 1.0 meq/g and about 1.6 meq/g.

It should be apparent, however, that certain alternative processes may be employed to form the sulfonated constituents. For example, formation of at least partially sulfonated polystyrene could result from the copolymerization of polystyrene and sulfonated styrene as disclosed, for example, in U.S. Pat. No.3,322,734. Similarly, the at least partially sulfonated monovinyl hydrogenated diene block copolymer could be formed by copolymerizing at least partially sulfonated monovinyl arene with diene polymer and thereafter hydrogenating the diene polymer. Moreover, sulfonation reaction parameters can be varied for different constituents, and many such reaction parameters for different constituents are known in the art. For example, the sulfonation reaction could be carried out by the process disclosed in U.S. Pat. No. 3,577,357.

An additional feature of the present invention is a discovery that partially sulfonated polystyrene and block copolymer can be employed in the salt form to produce very efficient membranes. More specifically, after the sulfonation reaction is undertaken, the product can be treated with a base, for example, NaOH, to produce sulfonated product in the sodium salt form. Membranes comprising these constituents in the salt form vary depending upon the particular salt form employed. When forming membranes from solutions, or especially when forming membranes by extrusion or compression molding, the ionic form of the product will effect the ease of processing and, to some extent, the properties of the resultant membrane.

As described above, the degree of sulfonation is controlled to produce a product which has an ion exchange capacity within the above-noted ranges. The ion exchange capacity is controlled by such factors as the time and temperature of reaction, the ratio of sulfonation reactant to product constituents, and the concentration of reactants. In our most preferred embodiment, sulfonation is carried out by reacting acetic anhydride and sulfuric acid with a mixture of polystyrene and a polystyrene-hydrogenated butadiene block copolymer. The acetic anhydride and sulfuric acid react to produce acetylsulfuric acid which, in turn, reacts with the aryl groups to produce a sulfonated product. The expected reaction sequence is represented below:

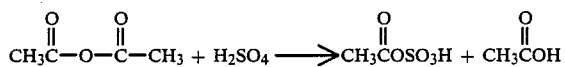

-continued

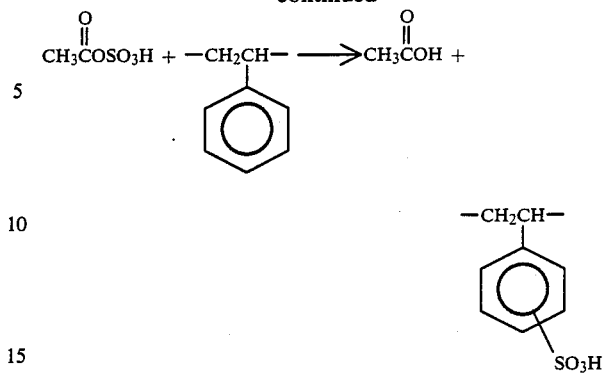

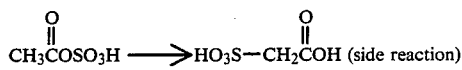

Figure 2:
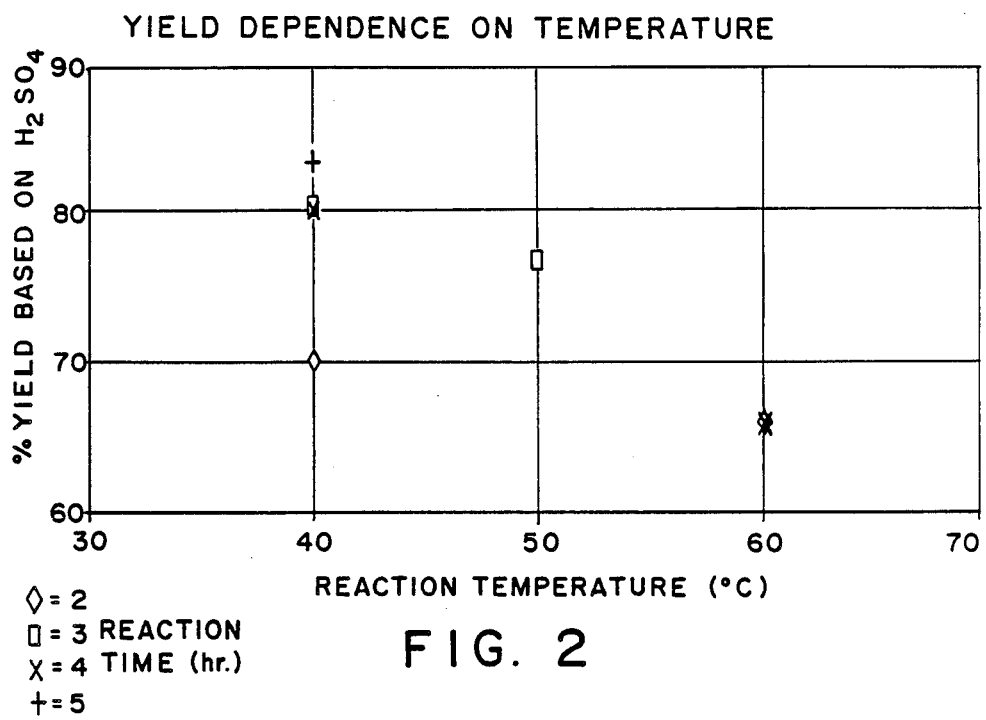
FIG. 2 illustrates the yield of sulfonated material (% $H_2SO_4$ which is converted to sulfonic acid groups on the polymer) as a function of the reaction temperature and time at temperature.

A ratio of anhydride to $H_2SO_4$ of at least about 1:1 is required in order to avoid the presence of free $H_2SO_4$ which can lead to a crosslinking reaction. Most preferably, a small excess of anhydride is employed but a large excess can reduce yield and is not desirable. FIG. 1 graphically illustrates the relationship of the molar ratio of anhydride to $H_2SO_4$ with respect to the percent yield (degree of sulfonation) based on the $H_2SO_4$ present in the reaction. FIG. 2 illustrates the relative yield of the reaction by plotting the observed capacity against the theoretical capacity (based on the $H_2SO_4$ in the reaction) at different molar ratios of anhydride to $H_2SO_4$. As shown in the figures, as the excess of anhydride increases, the yield (percent sulfonation) decreases.

Figure 3:
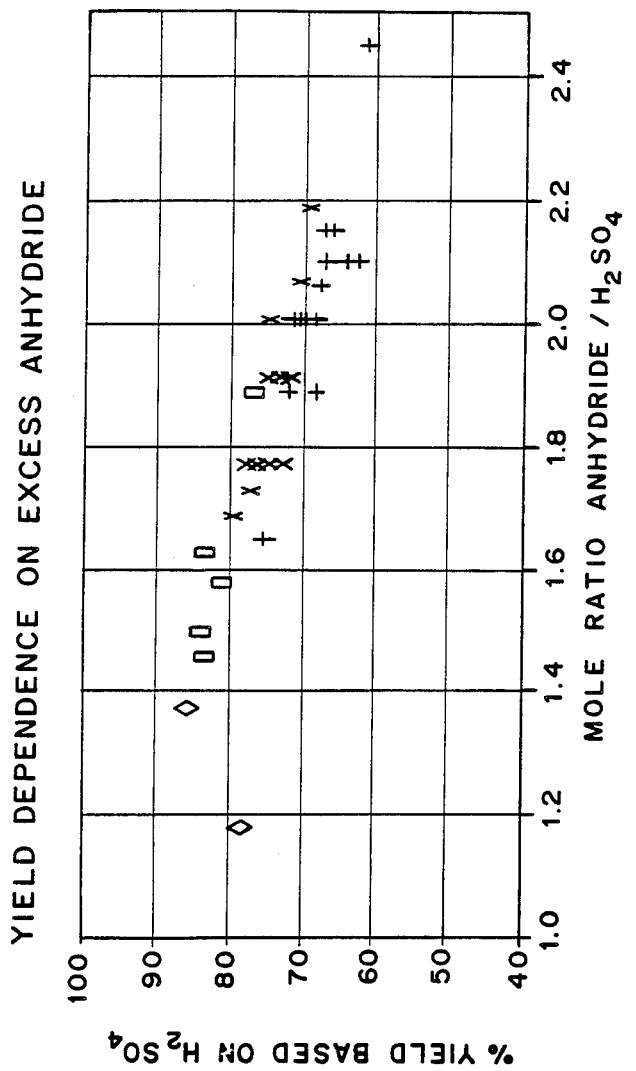
FIG. 3 illustrates the yield of sulfonated material as a function of the ratio of acetic anhydride to $H_2SO_4$ in the reaction.

FIG. 3 illustrates the effects of reaction time and temperature on the ion exchange capacity of the product. As is clearly shown, an optimum temperature and time exist during which the reaction can progress to within the preferred range of sulfonation for producing products within the scope of the present invention. Similarly, FIG. 4 graphically depicts the percent yield (degree of sulfonation) based on the amount of $H_2SO_4$ present as it relates to the time and temperature of the reaction.

The at least partially sulfonated product is dissolved in a suitable solvent and cast onto a substrate. The solvents useful in the present invention may be selected from diglyme, alkyl alcohols, N-methyl pyrrolidone, dimethyl sulfoxide, N,N-dimethylformamide and other known solvents for polar polymers. Use of a less polar co-solvent is frequently advantageous. Most preferably, N,N-dimethylformamide (DMF) is used with the most preferred polymers. The amount of solvent employed varies depending upon the polymers selected, the molecular weight of the polymer, the solubility of the cular polymers in the solvent, and the desired thickness of the membrane to be formed. Generally, mixtures or solutions for forming cation exchange membranes have a concentration of between about 10% and about 40% (wt. % of polymer). Bipolar membranes are generally formed from mixtures having a polymer concentration of between about 5% and about 40% by weight. However, lower amounts may be employed for forming either type of membrane depending upon the desired thickness of the layer or in the event that plural layers are cast on top of one another to form the membrane. Although the polymer and the solvent most preferably exist as solution, the production of a homogeneous mixture is totally acceptable for casting membranes of the present invention.

The mixture (solution) is then spread onto a substrate, e.g., a glass plate or previously formed layer(s) of a membrane, to a generally uniform thickness. The thickness of the mixture is variable depending on such factors as the concentration of polymer in the mixture and the desired thickness of the layer. Ordinarily, cation membranes will be cast to a final thickness of between about 4 mils (0.1 mm) and about 10 mils (0.25 mm) by forming an initial layer of a thickness of between about 15 mils (0.375 mm) and about 30 mils (0.75 mm). Bipolar membranes comprise a layer generally having a thickness of between about 1 mil (0.025 mm) and about 3 mils (0.075 mm) from a mixture cast to an initial thickness of between about 5 mils (0.125 mm) and about 15 mils (0.375 mm).

After being spread to a general uniform thickness, the solvent is evaporated from the mixture. This step is ordinarily accomplished by placing the mixture in an oven. Generally, the temperature in the oven will be about 25° C. to about 50° C. less than the boiling point of the solvent to avoid bubbles in the layer. For DMF as a solvent, the temperature in the oven will, ordinarily, range from between about 100° C. to about 130° C. And the time at temperature will range from about 5 minutes to about 15 minutes to substantially completely dry the layer. Thereafter, the layer is cooled and then, in the case of forming a single layer cation exchange membrane or in the case of forming the final layer of a bipolar membrane, the membrane is removed from the substrate. When glass plates are employed as a substrate, the membranes are usually soaked free of the plate in a salt solution, for example, 0.5 molar $Na_2SO_4$, to free the membrane from the plate.

We have also determined that annealing the membranes subsequent to removal from the plate increases the long-term stability of the electrical properties of the membranes. The annealing step consists of heating the membranes at a moderate temperature (usually between about 40° C. and about 70° C.) in a moderately concentrated salt solution (typically, 1M NaCl or 0.5M $Na_2SO_4$) for a period of at least about 2 hours. In the most preferred embodiment of our invention, the annealing step is carried out by heating the membrane at 55° C. in 0.5M $Na_2SO_4$ for about 12 hours. Use of potassium or other salts for the annealing step may also be advantageous. Membranes which have not been annealed may initially exhibit superior electrical properties but the properties degrade in use or on storage over relatively short terms. A comparison of the resistivity and efficiency of a number of membranes (all made in accordance with the procedures described above) in the annealed and unannealed condition is set forth in Examples 3–80 hereinbelow.

The following examples are provided to illustrate the scope of the invention, but are not intended to limit the invention in any manner.

EXAMPLE 1

Sulfonation Reaction

A 2000-mL three-necked Morton flask was fitted with a mechanical stirrer, thermometer and addition funnel topped with a drying tube. The flask was charged with 170.0 g polystyrene pellets (Dow, XP6065 27W CLEAR) and approximately 550 mL dichloroethane. The mixture was stirred slowly overnight to dissolve. A 1000-mL Erlenmeyer flask fitted with a magnetic spinbar was charged with 42.0 g a styrene-butadiene block copolymer, hydrogenated to give a polyolefin center block (Kraton G 1652, Shell Oil Co.) and approximately 450 mL dichloroethane. Dissolution was affected by stirring for about an hour in a water bath at 50°–60° C.

The Kraton G solution followed by 55 mL acetic anhydride was added to the polystyrene-containing reaction flask. The contents were heated with stirring in an oil bath until the temperature reached 37° C. The oil bath was lowered, stirring was continued at approximately 100 rpm, and 33.0 g 96% sulfuric acid was added dropwise over 6.2 minutes. There was an exotherm to 42° C. In about 20 minutes the reaction mixture cooled to 40° C., and this temperature was maintained with the oil bath for 5 hours (from the first addition of acid).

The oil bath was replaced with an ice water bath. When the temperature of the reaction mixture reached 30° C., a mixture of 50 mL methanol with 250 mL dimethylformamide was added. The addition rate was adjusted to maintain the temperature between 25°–30° C. There was a moderate exotherm during the initial part of this operation.

The reaction mixture was reduced in volume on a rotary evaporator with water aspirator vacuum and heating in a water bath at 40°–50° C. Residual volatile components were removed by adding portions of dimethylformamide and evaporating with rotary oil pump vacuum in the water bath as above. A total of 1750 mL were added in 3 portions. The mixture was filtered through polypropylene cloth (74 micron mesh) and stored sealed under argon until use. The product had an ion exchange capacity of 1.10 meq/g.

EXAMPLE 2

About 10 mL of a 25% solution of sulfonated Kraton-G/polystyrene in DMF (prepared as in Example 1) was poured on a ⅛″ thick glass plate and spread to a uniform thickness by a doctor knife set to a gap of 20 mils. The cast solution was placed in a forced draft oven at 125° C. for 15 mins., removed, and, after cooling, soaked free of the plate in 0.5M $Na_2SO_4$ solution. The properties of the membrane were stabilized by heating the membrane in 0.5M $Na_2SO_4$ overnight at 55° C. The efficiency of the membrane in 15 wt. % NaOH was 77%. The resistance in 0.5M $Na_2SO_4$ at 30° C. was 4.2 $\Omega$-cm$^2$.

EXAMPLES 3–80

The data disclosed in Tables 1, 2 and 3 below clearly illustrate the essential process parameters employed in forming cation exchange membranes in accordance with the present invention and the properties exhibited by the membranes. Examples 3–52 illustrate membranes which were not annealed prior to making resistivity and efficiency measurements. Examples 53–80 illustrate membranes which were annealed in 0.5M $Na_2SO_4$ at about 55° C. overnight (estimated to be, on average, about 16 hours) prior to making resistivity and efficiency measurements. Although there generally exists a decrease in efficiency and an increase in resistivity in the annealed membranes v. unannealed membranes, the long-term stability of the annealed membranes is dramatically improved.

Table 1 sets out the constituents employed to form cation exchange membranes in accordance with the present invention and the time and temperature of the sulfonation reaction. The polystyrenes employed are manufactured by Dow Chemical Company, and the copolymer was Kraton G ® of Shell Oil Company.

Table 2 indicates the sulfonation materials employed, the mole ratio of acetic anhydride to $H_2SO_4$, and the theoretical ion exchange capacity based on 100% yield, as well as the ion exchange capacity of the at least partially sulfonated reaction product.

Table 3 sets forth the actual percent yield of the sulfonation reaction, and the efficiency and resistance of the resulting cation membrane. The efficiency was measured in 15 wt % NaOH and the resistivity in 0.5M $Na_2SO_4$.

The current efficiency for the membranes of Examples 3–80 was measured by the following procedure. A cell consisting of a cation exchange membrane of the present invention interposed between two Nafion ® 110 cation exchange membranes and four separators formed a 4-compartment cell which was placed between two electrodes. The exposed membrane area of the cation exchange membrane being tested was 11 cm². The anode rinse compartment (formed by the anode and a Nafion ® 110 membrane) and the cathode rinse compartment (formed by the cathode and a Nafion ® 110 membrane) were charged with 1 liter of 0.5M $Na_2SO_4$. The salt compartment (formed by the Nafion ® 110 membrane of the anode rinse compartment and one side of the cation membrane being tested) was charged with 150 mL of 25% NaCl. The base compartment (formed by the Nafion ® 110 membrane of the cathode rinse compartment and the other side of the cation membrane being tested) was charged with 200 g of 15% NaOH. Solutions were circulated through the cell by pumps. A pH probe was placed in the salt compartment. A direct current of 1.2A was passed. About 1 mL of a standard solution of 0.5435M HCl in 22% NaCl was added to the salt solution to reduce the pH to about 1.5. As $OH^-$ ions leaked through the cation membrane being tested, the pH in the salt solution rises. When the pH measures 7, a measured amount of the standard HCl solution was added to the salt compartment and the time interval to return the pH in the salt compartment to 7 was recorded. From the data collected by this procedure, the current efficiency for $Na^+$ transport at 15% NaOH in the base compartment was calculated from the following equation:

$$\eta = \frac{1 - (96.5)(\text{meq}HCl \text{ added})}{i \Delta t}$$

where i=current passed through the cell in amperes, and $\Delta t$=the time interval in seconds to neutralize the acid added to the salt compartment.

The resistance of the membrane can be calculated employing the cell as described above. In this test, all compartments of the cell are charged with 0.5M $Na_2SO_4$. In each compartment formed in part by one side of the cation membrane being tested is inserted a salt bridge. Each salt bridge is connected externally to calomel electrodes and a high impedance volt meter. The voltage at several current levels is recorded. The resistance of the solution and membrane being tested is calculated from these values. The membrane is then removed and the voltage of the solution in the combined compartment is measured at different current levels. The resistance of the solution is calculated. The difference between the resistance of the solution with the membrane and the resistance of the solution without the membrane is the membrane resistance. Since this resistance is dependent on the area measured, the areal or sheet resistance is calculated by multiplying the membrane resistance by the exposed area of the membrane.

TABLE 1

| Ex. No. | T, °C. | T, hr | Polystyrene g | Polystyrene Grade | Copolymer g | Copolymer Grade | wt % |
|---|---|---|---|---|---|---|---|
| 3 | 50 | 3 | 170 | 6065 | 42 | 1652 | 20 |
| 4 | 50 | 3 | 159 | 6065 | 53 | 1652 | 25 |
| 5 | 50 | 3 | 159 | 6065 | 53 | 1652 | 25 |
| 6 | 50 | 3 | 170 | 6065 | 42 | 1652 | 20 |
| 7 | 50 | 3 | 170 | 6065 | 42 | 1652 | 20 |
| 8 | 50 | 3 | 170 | 6065 | 42 | 1652 | 20 |
| 9 | 50 | 3 | 159 | 6065 | 53 | 1652 | 25 |
| 10 | 50 | 3 | 159 | 6065 | 53 | 1652 | 25 |
| 11 | 50 | 3 | 170 | 6065 | 42 | 1652 | 20 |
| 12 | 50 | 3 | 170 | 6065 | 42 | 1652 | 20 |
| 13 | 50 | 3 | 170 | 6065 | 42 | 1652 | 20 |
| 14 | 40 | 4 | 170 | 6065 | 42 | 1652 | 20 |
| 15 | 50 | 3 | 170 | 6065 | 42 | 1652 | 20 |
| 16 | 40 | 2 | 170 | 6065 | 42 | 1652 | 20 |
| 17 | 60 | 2 | 170 | 6065 | 42 | 1652 | 20 |
| 18 | 50 | 3 | 170 | 6065 | 42 | 1652 | 20 |
| 19 | 50 | 3 | 170 | 6065 | 42 | 1652 | 20 |
| 20 | 50 | 3 | 170 | 6065 | 42 | 1652 | 20 |
| 21 | 50 | 3 | 170 | 6065 | 42 | 1652 | 20 |
| 22 | 60 | 2 | 170 | 6065 | 42 | 1652 | 20 |
| 23 | 60 | 4 | 170 | 6065 | 42 | 1652 | 20 |
| 24 | 40 | 2 | 170 | 6065 | 42 | 1652 | 20 |
| 25 | 60 | 4 | 170 | 6065 | 42 | 1652 | 20 |
| 26 | 40 | 2 | 170 | 6065 | 42 | 1652 | 20 |
| 27 | 50 | 3 | 170 | 6065 | 42 | 1652 | 20 |
| 28 | 50 | 2 | 170 | 6065 | 42 | 1652 | 20 |
| 29 | 40 | 3 | 170 | 6065 | 42 | 1652 | 20 |
| 30 | 50 | 3 | 170 | 6065 | 42 | 1652 | 20 |
| 31 | 50 | 3 | 170 | 6065 | 42 | 1652 | 20 |
| 32 | 50 | 3 | 170 | 6065 | 42 | 1652 | 20 |
| 33 | 40 | 4 | 170 | 6065 | 42 | 1652 | 20 |
| 34 | 40 | 4 | 170 | 6065 | 42 | 1652 | 20 |
| 35 | 40 | 4 | 170 | 6065 | 42 | 1652 | 20 |
| 36 | 50 | 3 | 170 | 6065 | 42 | 1652 | 20 |
| 37 | 40 | 4 | 170 | 6065 | 42 | 1652 | 20 |
| 38 | 40 | 4 | 170 | 6065 | 42 | 1652 | 20 |
| 39 | 40 | 4 | 170 | 6065 | 42 | 1652 | 20 |
| 40 | 40 | 4 | 170 | 6065 | 42 | 1652 | 20 |
| 41 | 50 | 3 | 170 | 6065 | 42 | 1652 | 20 |
| 42 | 50 | 3 | 170 | 6065 | 42 | 1652 | 20 |
| 43 | 40 | 4 | 170 | 6065 | 42 | 1652 | 20 |
| 44 | 40 | 4 | 170 | 6065 | 42 | 1652 | 20 |
| 45 | 50 | 3 | 170 | 6065 | 42 | 1652 | 20 |
| 46 | 40 | 4 | 170 | 6065 | 42 | 1650 | 20 |
| 47 | 40 | 5 | 159 | 6065 | 53 | 1650 | 25 |
| 48 | 40 | 5 | 170 | 6065 | 42 | 1650 | 20 |
| 49 | 40 | 5 | 180 | 6065 | 32 | 1650 | 15 |
| 50 | 40 | 5 | 170 | 6065 | 42 | 1652 | 20 |
| 51 | 40 | 5 | 159 | 6065 | 53 | 1650 | 25 |
| 52 | 40 | 5 | 180 | 6065 | 32 | 1650 | 15 |
| 53 | 40 | 5 | 191 | 6065 | 21 | 1650 | 10 |
| 54 | 40 | 5 | 170 | 6065 | 42 | 1652 | 20 |
| 55 | 40 | 5 | 180 | 6065 | 32 | 1650 | 15 |
| 56 | 40 | 5 | 201 | 6065 | 11 | 1650 | 5 |
| 57 | 40 | 5 | 159 | 6065 | 53 | 1650 | 25 |
| 58 | 40 | 5 | 180 | 6065 | 32 | 1652 | 15 |
| 59 | 40 | 5 | 180 | 6065 | 32 | 1651 | 15 |
| 60 | 40 | 5 | 180 | 6069 | 32 | 1650 | 15 |
| 61 | 40 | 5 | 170 | 6069 | 42 | 1651 | 20 |
| 62 | 40 | 5 | 180 | 6065 | 32 | 1651 | 15 |
| 63 | 40 | 5 | 180 | 6065 | 32 | 1651 | 15 |
| 64 | 40 | 5 | 170 | 6065 | 42 | 1652 | 20 |
| 65 | 40 | 5 | 180 | 6065 | 32 | 1651 | 15 |
| 66 | 40 | 5 | 170 | 6065 | 42 | 1650 | 20 |
| 67 | 40 | 5 | 180 | 6065 | 32 | 1652 | 15 |
| 68 | 40 | 5 | 170 | 6065 | 42 | 1651 | 20 |
| 69 | 40 | 5 | 159 | 6069 | 53 | 1652 | 25 |
| 70 | 40 | 5 | 170 | 6069 | 42 | 1652 | 20 |
| 71 | 40 | 5 | 191 | 6065 | 21 | 1651 | 10 |
| 72 | 40 | 5 | 170 | 6065 | 42 | 1652 | 20 |
| 73 | 40 | 5 | 170 | 6065 | 42 | 1652 | 20 |
| 74 | 40 | 5 | 170 | 6065 | 42 | 1652 | 20 |
| 75 | 40 | 5 | 170 | 6065 | 42 | 1652 | 20 |
| 76 | 40 | 5 | 170 | 6065 | 42 | 1652 | 20 |
| 77 | 40 | 5 | 170 | 6065 | 42 | 1652 | 20 |

TABLE 1-continued

| Ex. No. | T, °C. | T, hr | Polystyrene g | Polystyrene Grade | Copolymer g | Copolymer Grade | wt % |
|---|---|---|---|---|---|---|---|
| 78 | 40 | 5 | 170 | 6065 | 42 | 1652 | 20 |
| 79 | 40 | 5 | 170 | 6065 | 42 | 1652 | 20 |
| 80 | 40 | 5 | 170 | 6065 | 42 | 1652 | 20 |

TABLE 2

| Ex. No. | Anhydride ml | Moles/Mole $H_2SO_4$ | Acid g | Capacity of product for 100% yield based on $H_2SO_4$ meq/g | Measured capacity meq/g |
|---|---|---|---|---|---|
| 3 | 85 | 2.01 | 45 | 1.78 | 1.24 |
| 4 | 85 | 2.59 | 35 | 1.43 | 0.81 |
| 5 | 85 | 2.01 | 45 | 1.78 | 1.17 |
| 6 | 85 | 2.10 | 43 | 1.71 | 1.07 |
| 7 | 85 | 2.15 | 42 | 1.68 | 1.13 |
| 8 | 85 | 2.06 | 44 | 1.75 | 1.18 |
| 9 | 85 | 1.89 | 48 | 1.88 | 1.35 |
| 10 | 85 | 2.06 | 44 | 1.75 | 1.21 |
| 11 | 85 | 2.10 | 43 | 1.71 | 1.15 |
| 12 | 85 | 2.10 | 43 | 1.71 | 1.09 |
| 13 | 85 | 1.89 | 48 | 1.88 | 1.28 |
| 14 | 100 | 2.37 | 45 | 1.78 | 1.21 |
| 15 | 85 | 2.01 | 45 | 1.78 | 1.22 |
| 16 | 100 | 2.37 | 45 | 1.78 | 1.04 |
| 17 | 100 | 2.37 | 45 | 1.78 | 0.60 |
| 18 | 85 | 2.01 | 45 | 1.78 | 1.25 |
| 19 | 85 | 2.01 | 45 | 1.78 | 1.27 |
| 20 | 85 | 2.01 | 45 | 1.78 | 1.26 |
| 21 | 85 | 1.89 | 48 | 1.88 | 1.35 |
| 22 | 70 | 1.66 | 45 | 1.78 | 1.17 |
| 23 | 70 | 1.66 | 45 | 1.78 | 1.16 |
| 24 | 70 | 1.66 | 45 | 1.78 | 1.23 |
| 25 | 100 | 2.37 | 45 | 1.78 | 0.68 |
| 26 | 55 | 1.63 | 36 | 1.47 | 1.04 |
| 27 | 55 | 1.63 | 36 | 1.47 | 1.21 |
| 28 | 85 | 1.89 | 48 | 1.88 | 1.32 |
| 29 | 55 | 1.63 | 36 | 1.47 | 1.18 |
| 30 | 55 | 1.46 | 40 | 1.61 | 1.34 |
| 31 | 40 | 1.18 | 36 | 1.47 | 1.15 |
| 32 | 40 | 1.37 | 31 | 1.28 | 1.10 |
| 33 | 70 | 1.77 | 42 | 1.68 | 1.31 |
| 34 | 55 | 1.67 | 35 | 1.43 | 1.19 |
| 35 | 70 | 1.96 | 38 | 1.54 | 1.19 |
| 36 | 70 | 2.01 | 37 | 1.50 | 1.11 |
| 37 | 70 | 2.26 | 33 | 1.36 | 1.01 |
| 38 | 85 | 2.26 | 40 | 1.61 | 1.13 |
| 39 | 55 | 1.43 | 41 | 1.64 | 1.34 |
| 40 | 40 | 1.33 | 32 | 1.32 | 1.07 |
| 41 | 70 | 2.19 | 34 | 1.39 | 0.96 |
| 42 | 85 | 2.45 | 37 | 1.50 | 0.92 |
| 43 | 40 | 1.15 | 37 | 1.50 | 1.14 |
| 44 | 85 | 1.93 | 47 | 1.85 | 1.34 |
| 45 | 85 | 2.15 | 42 | 1.68 | 1.11 |
| 46 | 55 | 1.72 | 34 | 1.39 | 1.10 |
| 47 | 55 | 1.72 | 34 | 1.39 | 1.13 |
| 48 | 55 | 1.67 | 35 | 1.43 | 1.14 |
| 49 | 55 | 1.63 | 36 | 1.47 | 1.21 |
| 50 | 55 | 1.77 | 33 | 1.36 | 1.10 |
| 51 | 55 | 1.83 | 32 | 1.32 | 1.06 |
| 52 | 55 | 1.77 | 33 | 1.36 | 1.12 |
| 53 | 55 | 1.72 | 34 | 1.39 | 1.19 |
| 54 | 55 | 1.72 | 34 | 1.39 | 1.16 |
| 55 | 55 | 1.83 | 32 | 1.32 | 1.10 |
| 56 | 55 | 1.83 | 32 | 1.32 | 1.13 |
| 57 | 55 | 1.83 | 32 | 1.32 | 1.08 |
| 58 | 55 | 1.67 | 35 | 1.43 | 1.18 |
| 59 | 55 | 1.63 | 36 | 1.47 | 1.22 |
| 60 | 55 | 1.77 | 33 | 1.36 | 1.12 |
| 61 | 55 | 1.77 | 33 | 1.36 | 1.13 |
| 62 | 55 | 1.77 | 33 | 1.36 | 1.14 |
| 63 | 55 | 1.77 | 33 | 1.36 | 1.14 |
| 64 | 55 | 1.83 | 32 | 1.32 | 1.10 |
| 65 | 55 | 1.95 | 30 | 1.25 | 1.04 |
| 66 | 55 | 1.77 | 33 | 1.36 | 1.13 |
| 67 | 55 | 1.83 | 32 | 1.32 | 1.10 |
| 68 | 55 | 1.72 | 34 | 1.39 | 1.18 |
| 69 | 55 | 1.77 | 33 | 1.36 | 1.13 |
| 70 | 55 | 1.89 | 31 | 1.28 | 1.06 |
| 71 | 55 | 1.83 | 32 | 1.32 | 1.12 |
| 72 | 55 | 1.89 | 31 | 1.28 | 1.04 |
| 73 | 55 | 1.89 | 31 | 1.28 | 1.05 |
| 74 | 55 | 1.83 | 32 | 1.32 | 1.09 |
| 75 | 55 | 1.67 | 35 | 1.43 | 1.21 |
| 76 | 55 | 1.63 | 36 | 1.47 | 1.23 |
| 77 | 55 | 1.77 | 33 | 1.36 | 1.15 |
| 78 | 55 | 1.63 | 36 | 1.47 | 1.24 |
| 79 | 55 | 1.77 | 33 | 1.36 | 1.13 |
| 80 | 55 | 1.77 | 33 | 1.36 | 1.13 |

TABLE 3

| Ex. No. | % yield of Theoretical | Efficiency NaOH | Resistivity $Na_2SO_4$ |
|---|---|---|---|
| 3 | 69.6 | 86.0 | 3.1 |
| 4 | 56.9 | | |
| 5 | 65.7 | 90.7 | 3.2 |
| 6 | 62.2 | 94.3 | 7.4 |
| 7 | 67.0 | 93.4 | 5.9 |
| 8 | 67.5 | 90.4 | 4.3 |
| 9 | 71.8 | 71.9 | 2.3 |
| 10 | 69.5 | 85.3 | 3.3 |
| 11 | 67.1 | 92.3 | 4.4 |
| 12 | 63.8 | 94.9 | 4.1 |
| 13 | 68.2 | 76.3 | 2.5 |
| 14 | 67.9 | 92.2 | 3.6 |
| 15 | 68.6 | | |
| 16 | 58.6 | 98.8 | 7.9 |
| 17 | 33.8 | | |
| 18 | 69.9 | 86.1 | 3.2 |
| 19 | 71.3 | 82.2 | 2.9 |
| 20 | 70.5 | 79.9 | 3.2 |
| 21 | 71.9 | 67.8 | 2.0 |
| 22 | 65.6 | 85.3 | 3.6 |
| 23 | 65.4 | 89.1 | 3.9 |
| 24 | 68.9 | 86.1 | 2.9 |
| 25 | 38.4 | | |
| 26 | 71.0 | 98.3 | 7.8 |
| 27 | 82.7 | 85.2 | 3.9 |
| 28 | 70.0 | 76.5 | 2.4 |
| 29 | 80.1 | 91.8 | 4.1 |
| 30 | 83.0 | 76.1 | 2.4 |
| 31 | 78.6 | 88.4 | 3.9 |
| 32 | 85.5 | 91.9 | 6.2 |
| 33 | 78.3 | 77.4 | 2.4 |
| 34 | 82.8 | 88.7 | 4.5 |
| 35 | 77.2 | 90.2 | 3.9 |
| 36 | 73.9 | 97.5 | 4.9 |
| 37 | 74.2 | 98.4 | 8.3 |
| 38 | 70.5 | 92.7 | 4.3 |
| 39 | 81.6 | 75.6 | 2.3 |
| 40 | 81.1 | 95.1 | 6.4 |
| 41 | 68.7 | | |
| 42 | 61.0 | | |
| 43 | 76.2 | 91.6 | 5.3 |
| 44 | 72.4 | 74.9 | 2.8 |
| 45 | 66.1 | 95.6 | 7.5 |
| 46 | 78.6 | 79.5 | 5.4 |
| 47 | 80.8 | 69.6 | 3.4 |
| 48 | 79.3 | 69.7 | 3.2 |
| 49 | 82.5 | 71.0 | 3.2 |
| 50 | 81.2 | 77.4 | 4.2 |
| 51 | 80.4 | 80.7 | 5.6 |
| 52 | 82.3 | 80.3 | 4.5 |
| 53 | 85.3 | 79.5 | 3.8 |
| 54 | 83.5 | 71.5 | 3.8 |
| 55 | 83.3 | 88.6 | 4.4 |
| 56 | 85.5 | 93.1 | 4.7 |
| 57 | 82.0 | 77.6 | 3.7 |
| 58 | 82.4 | 71.7 | 3.4 |
| 59 | 83.3 | 67.3 | 3.0 |
| 60 | 82.4 | 79.1 | 3.4 |
| 61 | 83.3 | 77.0 | 3.3 |
| 62 | 83.6 | 82.5 | 5.7 |
| 63 | 84.1 | 79.4 | 5.4 |
| 64 | 83.1 | 82.3 | 4.0 |
| 65 | 83.3 | 94.8 | 6.9 |

TABLE 3-continued

| Ex. No. | % yield of Theoretical | Efficiency NaOH | Resistivity $Na_2SO_4$ |
| --- | --- | --- | --- |
| 66 | 83.3 | 77.3 | 4.4 |
| 67 | 83.5 | 84.3 | 5.1 |
| 68 | 84.8 | 71.7 | 3.2 |
| 69 | 83.2 | 67.1 | 2.0 |
| 70 | 82.5 | 83.4 | 2.6 |
| 71 | 84.6 | 89.5 | 2.2 |
| 72 | 81.3 | 87.9 | 7.1 |
| 73 | 82.0 | 85.9 | 5.9 |
| 74 | 82.5 | 81.8 | 4.9 |
| 75 | 84.7 | 71.7 | 2.7 |
| 76 | 84.1 | 68.9 | 2.4 |
| 77 | 84.5 | 77.3 | 4.5 |
| 78 | 84.5 | 71.9 | 3.0 |
| 79 | 82.9 | 83.2 | 4.6 |
| 80 | 83.4 | 81.1 | 5.1 |

EXAMPLE 81

Sulfonation Reaction

Into a 2 l three-necked round bottom flask fitted with a mechanical stirrer was charged 475 g of 7.5 wt. % Kraton-G solution in dichloroethane (DCE) and 1175 g of 15 wt. % polystyrene in DCE. The mixture was stirred for a time in a water bath maintained at about 50° C. 75 mL acetic anhydride was added by pipette over a period of about 10 min. Thereafter, 40 g of 96 wt. % sulfuric acid was added dropwise by a funnel over a period of about 10 mins. The reactants were maintained at 50° C. for 3 hrs. The reaction mixture was then transferred to a 3 l beaker. 125 mL of methanol and 1 l of DMF were added to the reaction mixture. The DCE was then removed from the reaction mixture using a rotating evaporator, leaving a viscous solution of sulfonated polymer in DMF.

A portion of the sulfonated polymer was then cast 25 mils (0.65 mm) thick (×25.4 cm wide ×50.8 cm long) onto a glass sheet. The casting was dried at 100° C. for 10 minutes and soaked free of the plate in water. The sheet was reacted with 4 l of 0.1 M NaOH for 4 hrs., then with water for an additional 4 hrs. The film, now in the sodium salt form, was dried in an oven overnight at 90° C. 10 g of the film was then dissolved in 30 g DMF to give a 25% solution used to produce the bipolar membrane described in Example 82 below.

EXAMPLE 82

A bipolar membrane was produced by the following procedure.

The anion layer of the bipolar membrane was formed by mixing 10.075 g poly(styrene- 35 wt. % vinylbenzyl chloride) copolymer [P(S-VBC(35)] in dimethylformamide (DMF) to form a 15 wt. % solution to which was added 0.83 g of 3:1 molar ratio N,N-dimethyl-1,3-propanediamine (DMPDA) to N,N,N',N'-tetramethyl-hexanediamine (TMHMDA). The mixed amine-containing solution was spread onto a substrate to a thickness of about 25 mils. The cast solution was held at room temperature for about 30 minutes and then dried in an oven at 125° C. for about 8 minutes to form an anion exchange layer. The anion exchange layer was then brush coated with a mixture of 2.069 g P(S-VBC35) in DMF and 3.041 g of a 10.2 wt. % suspension of cation exchange resin in DMF. The mixture was brush coated onto the anion exchange layer and thereafter heated in an oven at 125° C. for about 8 minutes to form a second layer. Thereafter, a mixture of 6.583 g of partially sulfonated polystyrene and hydrogenated butadiene block copolymer (Shell, Kraton-G 1652) in the sodium salt form in DMF at a concentration of 25 wt. % was formed (see Example 81). A portion of the mixture was cast to a thickness of 8 mil and was then heated for about 4 minutes at 125° C. Thereafter, an additional layer was formed by casting a second portion of the mixture to a thickness of 8 mil and thereafter heating the cast mixture for about 4 minutes at 125° C. The bipolar membrane produced by this procedure exhibited a voltage drop of 1.03 volts at 109 ma/cm$^2$ (100A/ft$^2$) and an efficiency in 2M NaCl of 87.4%.

EXAMPLE 83

A bipolar membrane was prepared by the following procedure. An anion exchange layer was formed by mixing 12.01 g of 15 wt. % P(S-VBC35) in DMF with 0.99 g of 3:1 molar ratio of DMPDA to TMHMDA. The mixture was held at room temperature for about 30 minutes. The mixture was then spread on a glass plate to a thickness of 25 mil and heated at 125° C. for about 8 minutes. The resultant anion exchange layer was then brush coated with a 1:1 weight ratio of P(S-VBC) and cation microgel resin. Thereafter, two layers consisting of partially sulfonated polystyrene-Kraton-G having an anion exchange capacity of about 1.35 meq/g were coated each to a thickness of 8 mils and each followed by heating at about 4 mins. at 125° C. The bipolar membrane produced by this procedure exhibited a voltage drop of 1.06V at 109 ma/cm$^2$ (100A/ft$^2$). Mechanically, the membrane was very strong and not brittle.

It will be apparent that various modifications, changes and additions may be made to the products and/or processes described herein by those skilled in the art without departing from the scope of the invention.

We claim:

1. A permselective membrane comprising a layer comprising a mixture of polystyrene, at least a portion of which is sulfonated between about 10 weight percent and about 35 weight percent monovinyl arene-hydrogenated diene block copolymer, at least a portion of which is sulfonated, said layer exhibiting ion exchange capacity of between about 1.0 meq/g and about 1.6 meq/g.

2. The permselective membrane of claim 1 wherein the monovinyl arene-hydrogenated diene block copolymer is styrene-butadiene block copolymer.

3. The permselective membrane of claim 1 wherein the copolymer is in the form of a salt.

4. The permselective membrane of claim 3 wherein the salt cation is a protonated amine.

5. The permselective membrane of claim 4 wherein the salt cation is a quaternary ammonium salt.

6. The permselective membrane of claim 1 wherein the amount of monovinyl arene-hydrogenated diene block copolymer is at least about 15 weight percent.

7. The permselective membrane of claim 1 wherein the ion exchange capacity of the layer is between about 3 meq/g and about 1.6 meq/g.

8. The permselective membrane of claim 1 wherein the resistance of the layer is less than about 8 $\Omega$-cm$^2$.

9. The permselective membrane of claim 1 wherein the resistance of the layer is less than about 4 $\Omega$-cm$^2$.

10. The permselective membrane of claim 2 wherein the amount of styrene-butadiene block copolymer is at least about 20 weight percent.

11. The permselective membrane of claim 2 wherein the hydrogen ion capacity is between about 1.0 meq/g and about 1.3 meq/g.

12. The permselective membrane of claim 6 wherein at least about 10% of the styrene portion of the polystyrene and block copolymer is sulfonated.

13. The permselective membrane of claim 7 wherein the resistance of the layer is between about 2.5 $\Omega$-cm$^2$ and about 3.5 $\Omega$-cm$^2$.

14. A cation permselective membrane comprising a layer containing a mixture of polystyrene, at least a portion of which is sulfonated, and between about 10 weight percent and about 35 weight percent monovinyl arene-hydrogenated diene block copolymer, at least a portion of which is sulfonated, said layer exhibiting an ion exchange capacity of between about 1.0 meq/g and about 1.6 meq/g.

15. The cation permselective membrane of claim 14 wherein the monovinyl arene-hydrogenated diene block copolymer is a styrene-butadiene block copolymer.

16. The cation permselective membrane of claim 15 wherein the block copolymer is present in an amount of at least about 15 weight percent.

17. The cation permselective membrane of claim 14 wherein at least about 10% of the styrene in the polystyrene and block copolymer is sulfonated.

18. The cation permselective membrane of claim 14 wherein the resistance of the layer is less than about 8 $\Omega$-cm$^2$.

19. The cation permselective membrane of claim 17 wherein the resistance is less than about 4 $\Omega$-cm$^2$ and wherein the current efficiency in 15 wt. % NaOH is at least about 75%.

20. The cation permselective membrane of claim 14 wherein the hydrogen ion capacity is between about 1.0 meq/g and about 1.3 meq/g.

21. A bipolar membrane comprising an anion exchange layer and a cation exchange layer comprising a mixture of sulfonated polystyrene and sulfonated monovinyl arene-hydrogenated diene copolymer, the cation exchange layer having an ion exchange capacity of between about 1.0 meq/g and about 1.6 meq/g.

22. The permselective membrane of claim 1 wherein the permselective membrane is a bipolar membrane.

23. The permselective membrane of claim 13 wherein the permselective membrane is a bipolar membrane.

24. The permselective membrane of claim 1 wherein between about 12% and about 20% of the styrene in the polystyrene and the block copolymer is sulfonated.

25. A method of making ion exchange membranes comprising the steps of:
(a) forming a mixture comprising sulfonated polystyrene and sulfonated monovinyl arene-hydrogenated
(b) forming the mixture into a layer of a prescribed thickness; and,
(c) evaporating solvent from the mixture.

26. The method of making stable permselective membranes comprising the steps of:
(a) forming an ion exchange membrane comprising a layer comprising a mixture of sulfonated polystyrene and sulfonated monovinyl arene-hydrogenated diene block copolymer, wherein the layer has an ion exchange capacity of between about 1.0 meq/g and about 1.6 meq/g; and,
(b) heating the ion exchange membrane at a temperature of between about 40° C. and about 70° C. in an aqueous salt solution for at least about 2 hours.

27. A permselective membrane comprising a layer comprising a mixture of polystyrene, at least a portion of which is sulfonated, and between about 10 wt % and 35 wt % monovinyl arene-hydrogenated diene block copolymer, at least a portion of which is sulfonated. diene block copolymer having an ion exchange capacity of between about 1.0 meq/g and about 1.6 meq/g in a solvent;

* * * * *